US007532894B1

(12) United States Patent
Muhonen et al.

(10) Patent No.: US 7,532,894 B1
(45) Date of Patent: May 12, 2009

(54) PROVIDING LOCATION INFORMATION OF A USER EQUIPMENT

(76) Inventors: Ahti Muhonen, Holperintie 39, Fin-04680, Hirvihaara (FI); Jan Kall, Jupperinmetsa 2B, Fin-02730, Espoo (FI); Marjatta Vacker, Ahdenkallionkatu 34 E, Fin-05820, Hyvinkaa (FI); Timo Rantalainen, Meripuistotie 4 A 7, Fin-00200, Helsinki (FI); Johanna Pekonen, Otsolahdentie 7 D 45, Fin- 02110, Espoo (FI)

( * ) Notice: Subject to any disclaimer, the term of this patent is extended or adjusted under 35 U.S.C. 154(b) by 676 days.

(21) Appl. No.: 10/110,661

(22) PCT Filed: Oct. 11, 2000

(86) PCT No.: PCT/EP00/10224

§ 371 (c)(1),
(2), (4) Date: Nov. 25, 2002

(87) PCT Pub. No.: WO01/28269

PCT Pub. Date: Apr. 19, 2001

(30) Foreign Application Priority Data

Oct. 15, 1999 (GB) .................................. 9924521.9

(51) Int. Cl.
*H04Q 7/20* (2006.01)
(52) U.S. Cl. .............. 455/456.1; 455/456.2; 455/456.3; 455/456.5; 455/404.2; 455/435.1; 455/446; 455/449; 455/458
(58) Field of Classification Search .............. 455/456.1, 455/456.4, 426.1, 456.6, 456.5, 428, 433, 455/435.1, 456.2, 456.3, 552.1, 446, 449, 455/458, 404.2
See application file for complete search history.

(56) References Cited

U.S. PATENT DOCUMENTS

| 5,642,398 | A | * | 6/1997 | Tiedemann et al. | ....... 455/426.1 |
| 5,675,629 | A | * | 10/1997 | Raffel et al. | ............. 455/552.1 |
| 5,828,958 | A | * | 10/1998 | Ishida et al. | ................ 455/433 |
| 5,946,619 | A | * | 8/1999 | Kolev | ....................... 455/432.1 |
| 6,101,387 | A | * | 8/2000 | Granberg et al. | ............ 455/433 |
| 6,134,446 | A | * | 10/2000 | Sasuta et al. | ............. 455/456.5 |
| 6,169,899 | B1 | * | 1/2001 | Havinis et al. | ............... 455/433 |

(Continued)

FOREIGN PATENT DOCUMENTS

JP       190949436       3/1998

(Continued)

OTHER PUBLICATIONS

"Digital Cellular Telecommunications System (Phase 2+); Locating Services (LCS); (Functional Description). Stage 2"—GSM 03.71 Version 7.0.0. Release 1998, pp. 1-59.

*Primary Examiner*—Dwayne D Bost
*Assistant Examiner*—Pierre-Louis Desir

(57) ABSTRACT

The present invention relates to provision of a location service. The location service is arranged to receive geographical location information associated with a user equipment of the communication system. In the method geographical location information associated with the user equipment is stored at a first location register of the communication system and processed in a predefined manner. A check is made whether geographical location information has or has not been transported from the first location register to a second location register. If the Information has not been transported, the processed geographical location information is transported from the first location register to the second location register.

40 Claims, 6 Drawing Sheets

U.S. PATENT DOCUMENTS

| | | | |
|---|---|---|---|
| 6,181,934 B1 * | 1/2001 | Havinis et al. | 455/432.3 |
| 6,311,060 B1 * | 10/2001 | Evans et al. | 455/426.1 |
| 6,311,069 B1 * | 10/2001 | Havinis et al. | 455/456.4 |
| 6,347,227 B1 * | 2/2002 | Johansson | 455/456.1 |
| 6,393,149 B2 * | 5/2002 | Friederich et al. | 382/173 |
| 6,463,288 B1 * | 10/2002 | Havinis et al. | 455/456.1 |
| 6,675,014 B1 * | 1/2004 | Sundquist | 455/435.1 |
| 6,718,173 B1 * | 4/2004 | Somani et al. | 455/456.1 |

FOREIGN PATENT DOCUMENTS

| | | |
|---|---|---|
| JP | 11-252129 | 9/1999 |
| WO | 9912378 | 3/1999 |
| WO | WO 99/12378 | 3/1999 |

* cited by examiner

PROVIDING LOCATION INFORMATION OF A USER EQUIPMENT

CROSS-REFERENCE TO RELATED APPLICATIONS

Priority is claimed from Great Britain application BG 9924521.9 filed 15 Oct. 1999.

FIELD OF THE INVENTION

The present invention relates to provision of geographical location information concerning the location of a user equipment used in a communications system.

BACKGROUND OF THE INVENTION

A cellular telecommunications system is based around cells or similar radio coverage areas. Examples of cellular telecommunications systems include standards such as, without limiting to these, AMPS (American Mobile Phone System), DAMPS (Digital AMPS), GSM (Global System for Mobile communications) or various GSM based systems (such as GPRS: General Packet Radio Service), CDMA (Code Division Multiple Access) or the proposed WCDMA (Wideband CDMA), or UMTS (Universal Mobile Telecommunications System) etc. In general, a cell coverage area or radio transceiver station coverage area of a telecommunications system can be defined as a certain geographically limited area covered by one or several base transceiver stations (BTS) serving mobile stations (MS) via an air or radio interface and usually connected to a base station subsystem (BSS). Each of the coverage areas of the system can be controlled by an appropriate controller apparatus. For example, in the currently proposed WCDMA standard each of the cells is controlled by at least one radio network controller (RNC), in the GSM system each of the cells is controlled by a base station controller (BSC) controlled by a mobile switching center (MSC) and in the GPRS system each of the cells is controlled by a serving GPRS support node (SGSN). The controller is connected further to a gateway or linking apparatus, such as a gateway GPRS support node (GGSN) or gateway mobile switching center (GSMC), linking the cell to the other parts of the communication system, such as to a PSTN (Public Switched telecommunications Network) or to a data network, such as to a X.25 based network or to a TCP/IP (Transmission Control Protocol/Internet Protocol) based network. Several cells connected to each other cover a larger geographical area, and thus several cells form together the coverage area of a cellular telecommunications network.

The user equipment (UE), such as a mobile station (MS), within one of the cells of the telecommunications system is respectively controlled by the controller functionality of the given cell. The UE may be controlled by only one controller at time. However, the UE may also be connected simultaneously to several controllers. This may occur e.g. when the cells overlap or in so called soft handoff mode, where the UE may be in communication with two base stations and those base stations may be connected to different controllers, or when one controller is controlling another controller controlling the UE. One controller can be defined as the serving (main) controller whereas the others act as secondary controllers.

The cellular telecommunications systems comprise further a registration functionality in order to be able to control the movements and operation of the mobile stations subscribing to the cellular telecommunications network. Each station subscribing to a cellular telecommunications network is permanently registered in the network system which stores subscriber related data. This data may be the current location of the mobile station so that continuous track of the location can be kept for the purposes of call routing. In the GSM terminology, the permanent location registers are often referred to as home location registers (HLR). Each network may comprise one or several permanent or home location register. The register can be a stand-alone network element or the register can be built into a network controller or into any other network element.

In addition to the permanent registers, the cellular telecommunications networks comprise temporary or visitor location (VLR) registers. These temporary registers handle only temporary i.e. visiting subscribers, i.e. the mobile stations within the service area of the associated network controller at a given point of time. The temporary location register keeps track of the given service area within which the mobile station may be located and is constantly informed of whether the mobile station is ON or OFF. Each network controller may have its own visitor location register or the network controllers may share a stand-alone visitor location register or a visitor location register disposed within another network element.

The user equipment or mobile station communicates with an appropriate network controller and provides the controller with various kinds of information. For instance, in a 'cell update' or similar situation, e.g. when the mobile station (MS) changes from one cell to a new cell or when the mobile station is switched on in one of the cells after having been switched off or unreachable for a while, the mobile station will send a message containing a MS identifier (ID) to the controller of the new cell. The controller of the new cell may be the same as in the previous cell or it may be different from the previous controller handling the MS before the cell change. The MS ID comprises data required by the telecommunications system in order to be able to handle the incoming/outgoing call and signalling to/from the MS, respectively. Once the MS ID is received by the system, the system is aware of the current location of the particular MS.

The use of cells or similar geographically restricted and known radio coverage areas and associated controllers facilitates the telecommunications system to produce at least a rough location estimate concerning the current location of an individual mobile station. More particularly, the telecommunications system is always aware (at least roughly) of the current location of such mobile stations which are communicating with at least one of the base stations of the system and are thus registered within at least one of the location registers of the system (i.e. are located within one limited radio coverage area of the system). This information is available even when the mobile station is located within a coverage area of a visited or "foreign" network, as the visited network is capable of transmitting the location of the mobile station back to the home location register, e.g. for the purposes of routing and charging. It is also possible to input location information provided by an external system for providing location information of a station into the telecommunications system, and to subsequently process and utilize this location information in the telecommunications system.

There is a proposal for a location service feature provided by means of a cellular telecommunications network which could provide the last known location of a mobile station together with a time-stamp. This feature can be provided by a separate network element or server which receives the information from the various controllers of the system. More particularly, the determination of the location of the mobile user can be based on the location information received from databases of the visited controllers of the telecommunications system, e.g. from a visitor location register (VLR) in the GSM system. This type of arrangement would give the location to within of one base station or cell, i.e. it would indicate that the mobile station is (or at least was) within the coverage area of a certain base station or cell. The accuracy of the location determination can be improved by e.g. utilizing results of measurements which define the travel time (or travel time differences) of the radio signal sent by the mobile station to the base station.

However, this approach could cause a relatively large amount of signalling load to the telecommunications system. When the location server sends an enquiry for location information, the request will be directed firstly to the home location register. The home location register, however, does not have the location information and may thus only give the address of a correct visitor location register and/or reroute the enquiry to a correct visitor location register including the requested data. The enquiry is thus redirected from the home location register to the visitor location register, and only after this the required data can be retrieved and transmitted as the response to the enquiry to the location server. The location information could also be stored in the home location register, but this would cause too much signalling between the visitor location register and the home location register. This is because each of the visitor location registers would then be continuously sending location information to the home location register every time a mobile station moves such that the location information needs an update. As a large number of mobile stations subscribe to each of the mobile telecommunications networks, this would cause a greater signalling load than the network system could handle. This extra transmission load would have an adverse effect on the operation of the communications system and would consume more of the limited network resources.

In addition, the processing and storing of the geographical location information requires additional memory resources in the communication system. The various location registers of the communication system may have only limited capabilities to store any additional information. This is especially the case if a location update history for a predefined period (e.g. for the last hour or day) is to be collected and stored. In case the history information is used, it is possible that the station has moved a relatively long way, whereby the "too old" information becomes irrelevant and may even cause an error in the location estimate. In case only the last determined geographical location of the user equipment is stored and used for the location estimation, this may not in all instances give the most reliable results. This kind of approach may even give a seriously incorrect location, e.g. in a situation where a emergency call becomes incorrectly located into a wrong side of a river.

SUMMARY OF THE INVENTION

It is an aim of the embodiments of the invention to address one or several of the above problems and also to provide a solution by means of which the interaction of the location registers of a communication system may be made more efficient without causing excessive load to the system and/or by means of which a more efficient use of memory resources of the system can be achieved.

According to an aspect, the present invention provides a method in a communication system for providing a location service with geographical location information associated with a user equipment capable of communicating with the communication system, the method comprising the steps of: storing geographical location information associated with the user equipment at a first location register of the communication system; processing said geographical location information; determining that processed geographical location information is transported from the first location register to a second location register during a monitoring period; and otherwise transmitting the processed geographical location information from the first location register to the second location register.

According to a further aspect, the present invention provides a communications system comprising: a first location register, wherein the first location register is arranged to store geographical location information associated with a user equipment of the communication system; processing means for processing the geographical location information; a second location register arranged to receive location information from the first location register; a communication path between the first and the second location registers for transmission of geographical location information between the first and second location registers; verification means for periodically checking that the processed geographical location information is transported from the first location register to the second location register during a monitoring period; and control means responsive to a signal from the verification means for initiating the transmission of the geographical location information, the transportation being arranged to be initiated in the event that the signal does not indicate transportation of the geographical location information during the monitoring period.

According to more specific embodiments the transportation of the geographical location information is determined to be accomplished if one or more of the following events occur during the monitoring period: a transmission of a message including geographical location information from the first location register to the second location register, a predefined type of transmission from the first location register to the second location register, a predefined change in the operational status of the user equipment, a predefined change in the operational status of the communication system, attachment or deattachment of the identity of the user equipment, a request by a location service to receive geographical location information, a call to the user equipment or from the user equipment.

The geographical location information may include a timestamp.

The method may comprise further steps of receiving the processed geographical location information at the second location register, verification whether the received geographical location information is more recent than the geographical location information stored in the second location register, and in the event that the received information is more recent, updating the geographical location information stored in the second location register.

The geographical location information associated with the user equipment may be requested from the second location register, and the requested geographical location information may be transmitted from the second location register to a location information service as response to the request.

The stored geographical location information may comprise results of successive measurements of the geographical location of the user equipment.

The processing of the geographical location information may comprise deleting at least some of the stored geographical location information. The deleting may be accomplished as a function of time such that the remaining geographical location information comprises proportionally more recent results than older results, whereby the stored information is biased towards the more recent location updates. According to one aspect, the processing of the geographical location information may comprise compressing the stored geographical location information.

An indication may be attached into the information stored in the first location register to indicate whether the location information stored in the first location register has already been transmitted to the second location register or not. The location information may be made more accurate by means of a correction parameter.

By means of the proposed embodiments it is possible to use location registers of a communication system in a more efficient manner for providing geographical location information for a location service. The embodiments assist also in intensifying the interaction between a temporary location register and a permanent location register of the communication system and can be used for optimizing the amount and/or timing of signalling between the registers of the system. In addition, memory resources of the system can be used more efficiently.

BRIEF DESCRIPTION OF THE DRAWINGS

For a better understanding of the present invention and as to how the same can be carried into effect, reference will now be made by way of example to the accompanying drawings in which.

DESCRIPTION OF THE PREFERRED EMBODIMENTS

Figure 1:
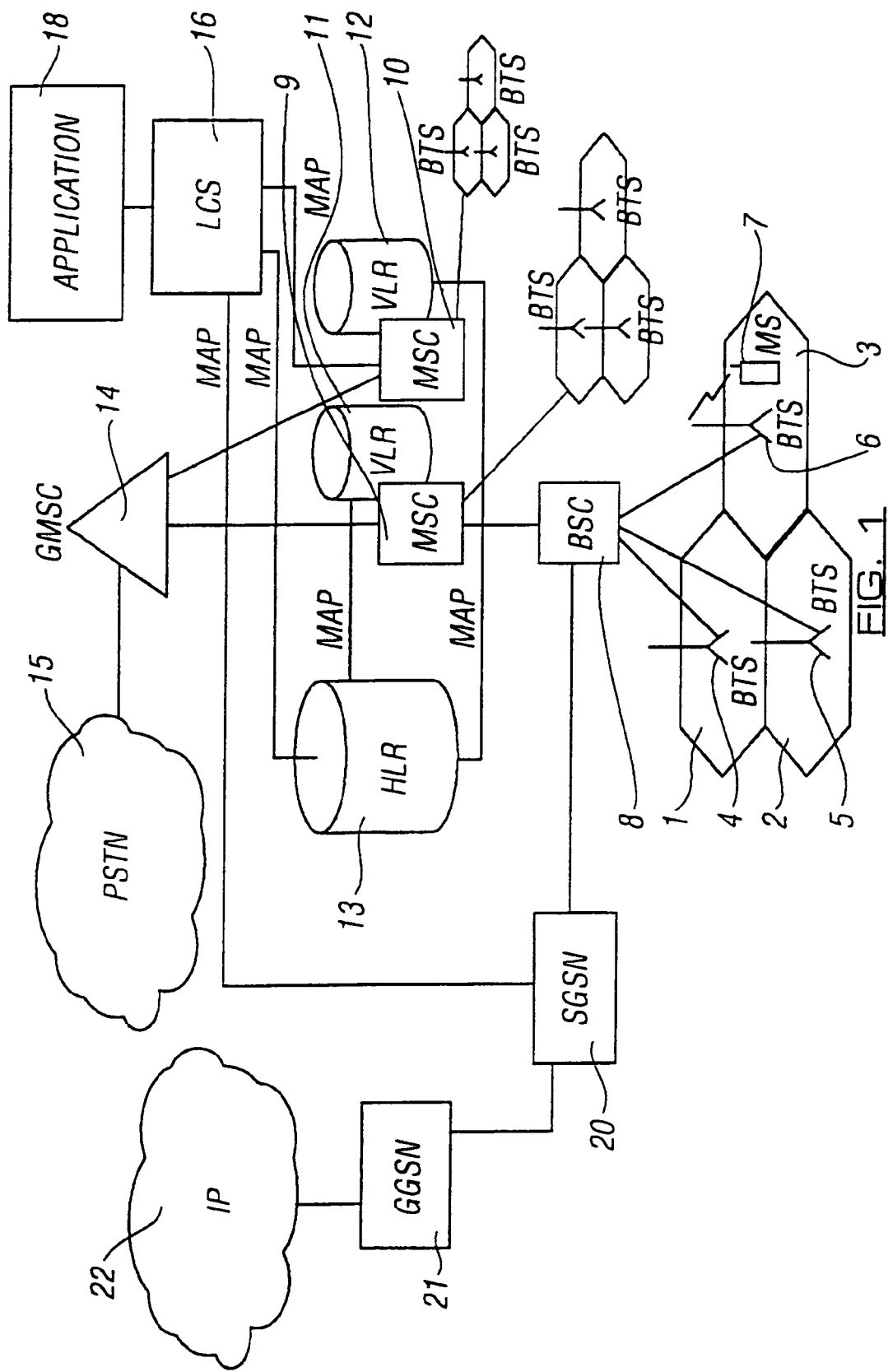
FIG. 1 shows a schematic diagram of a cellular radio network system in which embodiments of the invention can be implemented.

Reference will first be made to FIG. 1 illustrating a general view of one possible mobile telecommunications system having a location service. It is noted that even though the exemplifying telecommunications network shown and described in more detail in the following uses the terminology of a circuit switched GSM (Global System for Mobile communications) public land mobile network (PLMN), the proposed solution can be used in any system providing communications between a transmitting station and a receiving station and some degree of location functionality for at least one of the stations. It should also be appreciated that even though FIG. 1 shows three base station groups which each provide three omnidirectional radio coverage areas 1, 2 and 3, the embodiments of the invention can be implemented using any number of radio coverage areas. The coverage areas 1, 2 and 3 can also be, instead of base station coverage areas, three cell coverage areas of the mobile communications network, where the coverage area of one cell includes more than one base station. It is also possible to group several cells such that one coverage area comprises more than one cell. For example, URA (UMTS Terrestrial Radio Access Network Registration Area) in the UMTS standard consist of a group of cells. It is also noted that the radio coverage area can consist of a sector of base station provided with a directional or sector antenna (not shown). The sector base station may use e.g. three 120° directional antennas whereby three radio coverage areas are provided, or four 90° directional antennas providing four radio coverage areas and so on, or any combinations of different radio coverage beam widths. It should also be appreciated that base stations can sometimes be referred to as node B (e.g. in the UMTS standard).

In FIG. 1 each radio coverage area 1, 2 and 3 is served by the respective base transceiver station (BTS) 4, 5 and 6. Each base transceiver station BTS is arranged to transmit signals to and receive signals from the mobile station (MS) 7 or other user equipment in the cell. Likewise, the mobile station 7 is able to transmit signals to and receive signals from the respective base transceiver station. The mobile station 7 accomplishes this via wireless communication with the base stations. Typically a number of mobile stations will be in communication with each base station although only one mobile station is shown in FIG. 1 for clarity.

Each of the base stations is connected to a respective network controller, which in one form of the exemplifying GSM system comprises a base station controller 8 connected further to a Mobile Switching Center (MSC) 9. However, as is also shown by FIG. 1, in some arrangements the base station controller 8 controlling one or several base stations between the network controller and the base stations can be omitted. Regardless of the implementation, some kind of controller functionality is provided for controlling the base stations. Each of the network controllers controls its service area, i.e. the cells and base stations connected to it, either directly or via the base station controller. It is noted that more than one base station or base station group can be connected to each network controller. Typically more than two network controllers are also provided in a network. The network controller is connected to other elements or parts of the telecommunications network system via a suitable linking or gateway apparatus, such as Gateway Mobile Switching Center (GMSC) 14.

The implementation of the communication between the mobile station and the controller is known, and will thus not be discussed in more detail herein. It is sufficient to note that the interface may comprise channels in both uplink and downlink direction between the mobile station in the cell associated with a given base station and the controller of that base station. The information sent to the mobile station and the data sent from the mobile station can be in packet form (e.g. in the GPRS, WCDMA or UMTS systems). However, other formats for transmitting information are not excluded and in alternative embodiments of the invention the data may thus be sent in any suitable format. The messages including the information packets (or similar data units) which are sent from the mobile stations can include information identifying the mobile station (for instance, MS ID and/or IMSI (Mobile Station Identity and/or International Mobile Subscriber Identity, respectively)), and thus the message will include information which allows the communication system to identify from which mobile station the message has been received.

FIG. 1 also illustrates the possibility of using a packet switched mobile telecommunications service for communication with a data network 22. The illustrated GPRS (General Packet Radio Service) is based on the GSM technology and it may use the existing GSM base stations and other network elements for its operation. The GPRS comprises a serving GPRS support node (SGSN) 20 corresponding substantially to the MSC of the GSM networks for controlling the service area and a gateway GPRS support node (GGSN) 21 for interfacing with the data network, for example the TCP/IP (Transport Control Protocol/Internet Protocol) Internet 22. In the GPRS system the network controller SGSN 20 is arranged to pass on data packets to be transmitted to the mobile station 7 by the respective base station. The controller will also receive from the base station packets of data which it has received from the mobile station.

The mobile station 7 is able to move from one radio coverage area to another coverage area, e.g. from cell 1 to cell 2 or from one cell group to another cell group. The location of the mobile station 7 may thus vary in time as the mobile station is free to move from one location (base station coverage area or cell coverage area) to another location (to another coverage area) and also within one coverage area. To ensure proper operation of the system and to avoid disconnecting a possibly ongoing call, handover procedures are provided so that all necessary information will become available for the parties involved (e.g. for the previous and new network controller).

The mobile station may also be in communication with more than one base station, e.g. during a so called soft handoff procedure.

In order to be able to control a roaming mobile station communicating with different base stations of the mobile telecommunications network the mobile station is registered permanently to a particular home location register and temporarily to a visitor location register. In the example of FIG. 1 the mobile telecommunications network comprises a stand-alone home location register 13 and both of the MSCs 9 and 10 comprise a Visitor Location Register (VLR) 11 and 12, respectively. The mobile station 7 of FIG. 1 is registered both in the HLR 13 of the mobile telecommunications network and in the VLR 11 of the visited service area. It is noted that a mobile telecommunications network may include several home location registers and that the home location registers may be included in one or several of the network controllers. The home and visitor location registers can communicate with each other e.g. over a MAP (Mobile Application Part) interface or any other suitable interface.

The arrangement is such that the MS 7 is registered permanently to the HLR 13. The HLR 13 centrally and permanently stores all subscriber information associated with the particular MS 7. This information stored in the HLR can include various user related information and the location information for this particular MS. The VLR, such as VLRs 11 or 12, is used for storing information relating to the mobile stations visiting the service area of the MSC associated with the VLR. The visited VLR is capable of providing the HLR with location information concerning the current location of the MS 7 and any possible updates of the location information.

FIG. 1 shows also a Location Services (LCS) node 16 providing Location (LC) services for different applications or clients 18 who are entitled to receive at least some degree of information concerning the geographical location (or location history) of a mobile station. The clients may be external, i.e. clients outside the communication system. The clients may also be internal, i.e. the functionalities of the communication system may use the defined geographical location information for the operation of the system (for instance, resource allocation location assisted handover, fleet management or location related billing). A more detailed proposal for the location service can be found from ETSI (European telecommunications Standards Institute) technical specification GSM 03.71. In general terms, the LCS functionality can be defined as a feature capable of providing information concerning the geographical location of a particular mobile station. The geographical location of the mobile station may be defined on the basis of the position of the mobile station relative to the base station(s) of the mobile telecommunications system. The location server node 16 is arranged to receive predefined data concerning the geographical location of the mobile station 7 and to process this data and/or some other predefined parameters and/or to compute appropriate calculations for determining and outputting the geographical location of the given mobile station. The location server may also be arranged to check the client's 18 right to receive any information.

The location server 16 is connected to the home location register 13 (e.g. by a MAP). However, it is noted that in addition to the connection with the home location register 13, the location server 16 could be connected to one or several of the network controllers of the telecommunications system, such as the connection between the MSC 10 and the LCS server or node 16 providing a connection for the VLR 12 towards the server 16. It is also possible to have a direct connection between the location server 16 and one or several visitor location registers 11 and 12 (not shown). The connection between the LCS node 16 and the HLR 13 could be alternatively or additionally arranged through one or several other network elements. It is also noted that even though the LCS node 16 is shown as a stand-alone element, it could be a part of an internal component or functionality of any of the controllers or gateway controllers or any other element of the telecommunications system.

The location information can be transmitted from the home location register 13 to the location server 16 in response to a request by the location server. The location server 16 may also receive location information updates periodically from the home location register or the register may provide the location server automatically with updated location information in the event of a change in the location of the mobile station. The home location register 13, in turn, receives the location information provided with a timestamp from the visitor location registers 11, 12 which have been communicating with the mobile station 7. The timestamp is attached to the data by the visitor location register and indicates the time the data was provided.

However, if the HLR is informed of every single change in the position of the mobile station by the current VLR (or several VLRs), this could in some instances cause a substantial amount of signalling load which could have an adverse influence on the overall operation of the communications system. In preferred embodiments, a filtering functionality is provided by means of which it is possible to control and limit the amount of signalling between the VLRs and the HLR.

Figure 2:
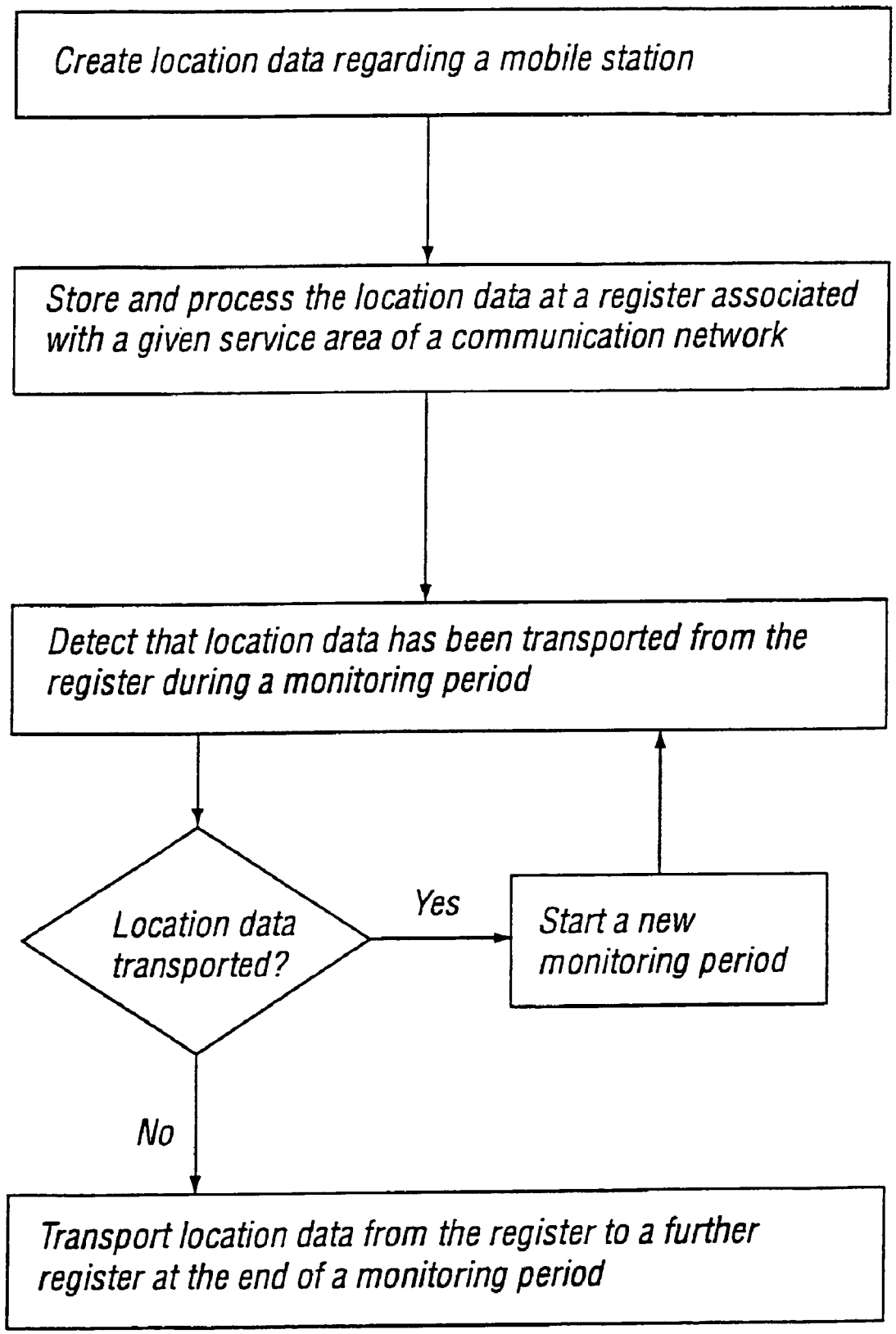
FIG. 2 is a flow chart for operation in accordance with an embodiment of the present invention.

FIG. 2 shows an embodiment of the operation by means of which it is possible to provide a periodical check regarding the need to transmit geographical location information from a first location register to a second location register. At the first step some location determination processing is made whereby geographical location information concerning the positioning coordinates of a mobile station is created. The creation of the location information may involve processing of information associated with a given mobile station and received from the network elements by a location functionality of a base station or a base station controller. The geographical location data is stored at the first location register, such as at one of the VLRs of FIG. 1.

At the next step the system monitors whether location information has been transmitted from the first location register during a predefined period. If no, recent geographical location information is transmitted from its storage (e.g. the visited location register) to a second location register, such as to the HLR 13 of FIG. 1. If the information has been transmitted, a timer of the verification function may be started from the beginning.

Figure 3:
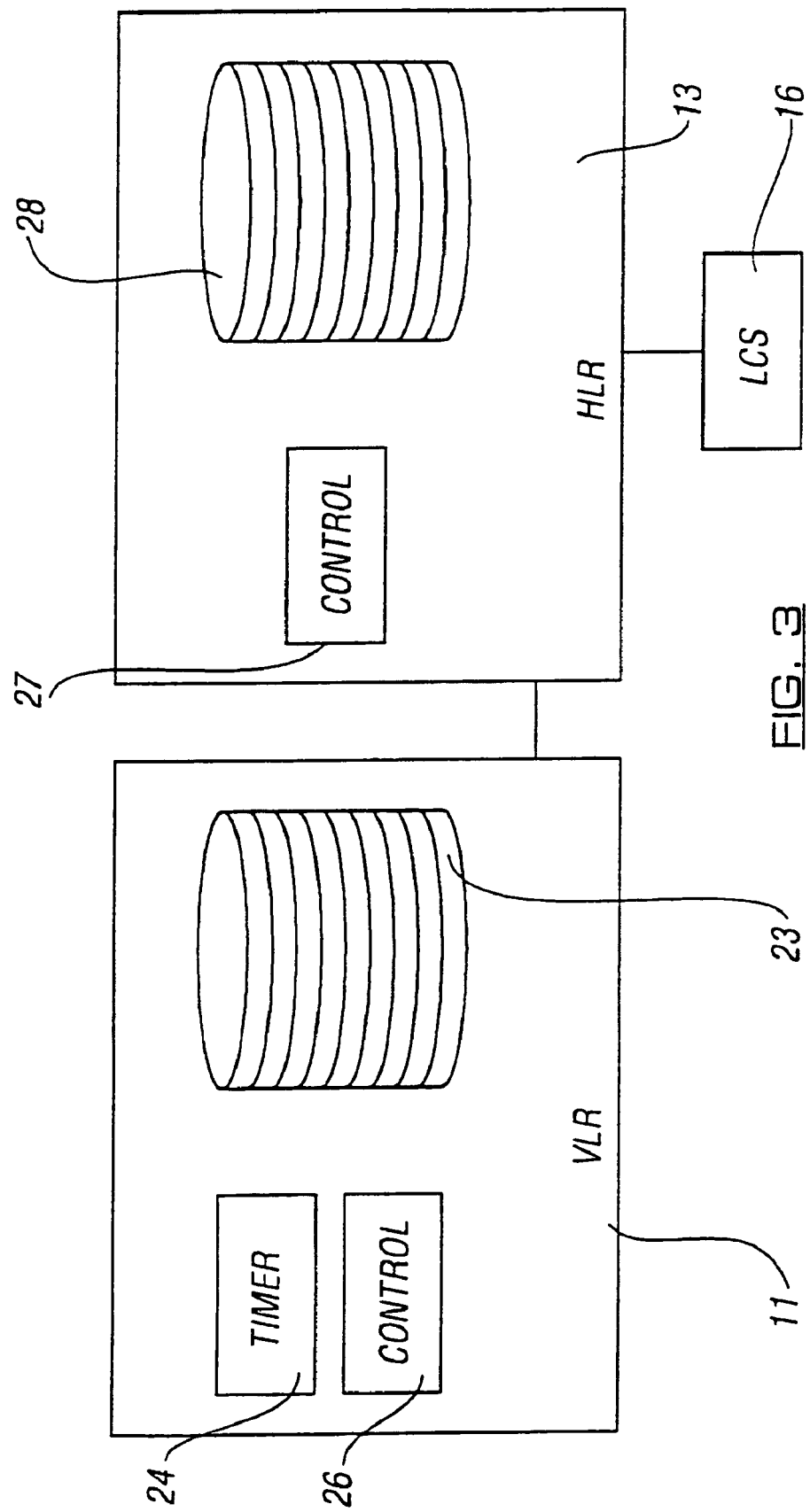
FIG. 3 is a schematic representation of a permanent location register and a temporary location register of a cellular communication system.
Figure 4:
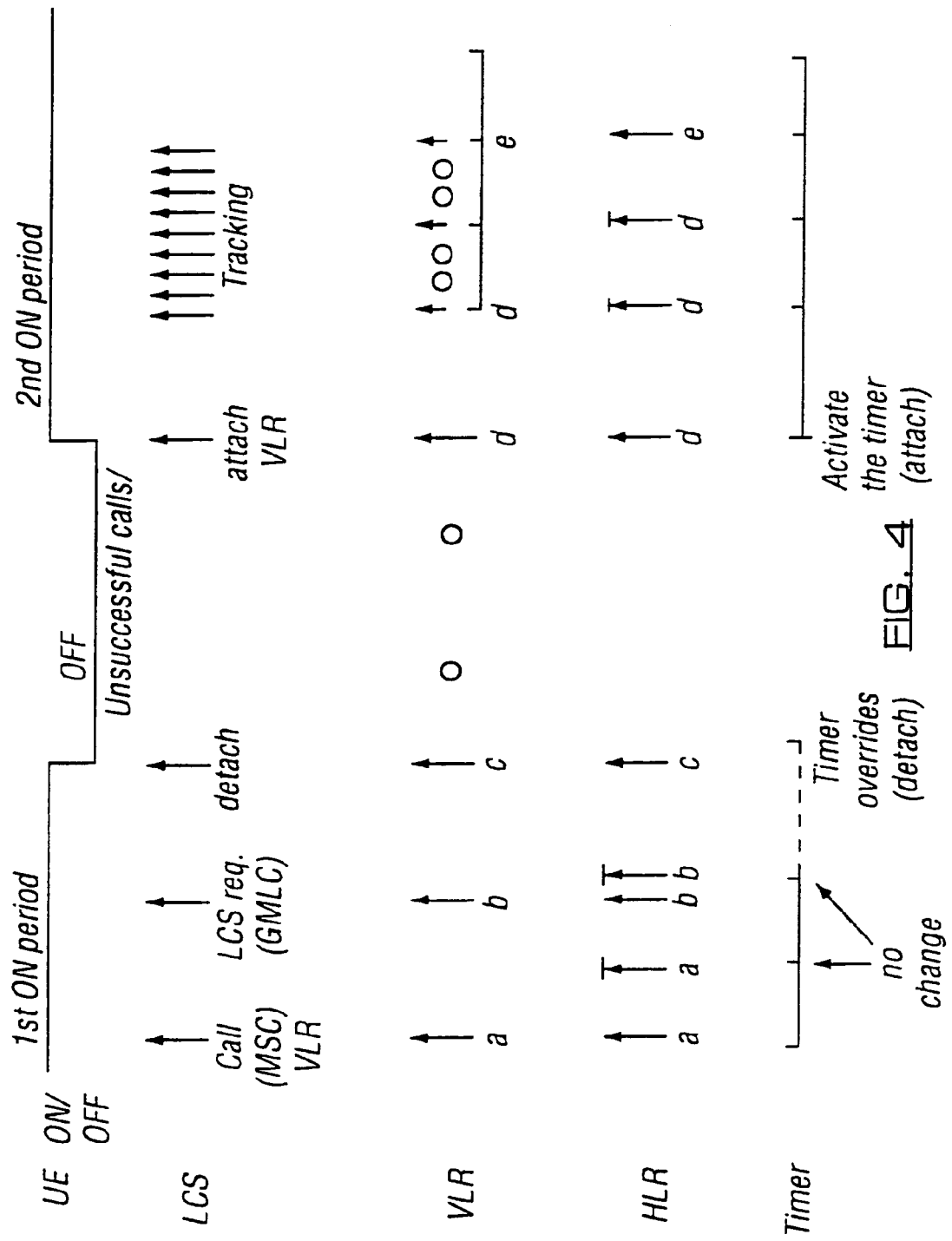
FIG. 4 is a schematic representation of some of the events in a communication system in accordance with an embodiment.

As illustrated by FIG. 3, the timer functionality can be implemented by means of a timer 24 within the visitor location register 11. As illustrated by FIG. 4 the timer can be arranged to measure a constant time period, whereafter a location information is sent from the first register or database functionality to a further register functionality. As is also illustrated by FIG. 4, the arrangement can be such that the information is not transmitted in case no change has occurred (e.g. the second a and the second b location during the first ON period). The timer functionality can be switched off whenever the mobile station is switched off, and then be restarted when the mobile station is switched on.

The timer 24 or a separate controller 26 controlling location information transportation operations and the timer 24 can also provide some advanced functions, such as different expiry time profiles for different mobile users, different expiry times for different times of the day, week, month or year. The controller is adapted to initiate transportation of the location information in response to a signal that the information has not been transmitted.

Information signal in a form of a flag or similar indication may be used in the location information for indicating whether the current location information has already been sent to the home location register or not. In case the flag indicates that the same data has already been transmitted to the home location register then there is no need for a retransmission of the data, and the timer 24 may restart from the beginning.

By means of a flag or similar indication indicating the status of the current data in the visitor location register database 23 (transmitted/not transmitted) it is also possible to arrange a periodic check as to whether to transmit the current location/timestamp information to the HLR or not. If the outcome of the periodic check is that the latest data has already been sent or that there is otherwise no need for sending the latest location information, then the data can be sent later, for instance in a dedicated message or piggybacked or encapsulated in the next standard message from the visitor location register 11 to the home location register 13.

According to an embodiment the timer may be reset whenever it is possible to transport the location information between the two registers. In this type of arrangement the checking of whether location information has been transported or not is not be suspended until the end of a monitoring period. If the information has been carried, the timer may not expire but has been restarted when the transportation of information occurred.

Figure 5:
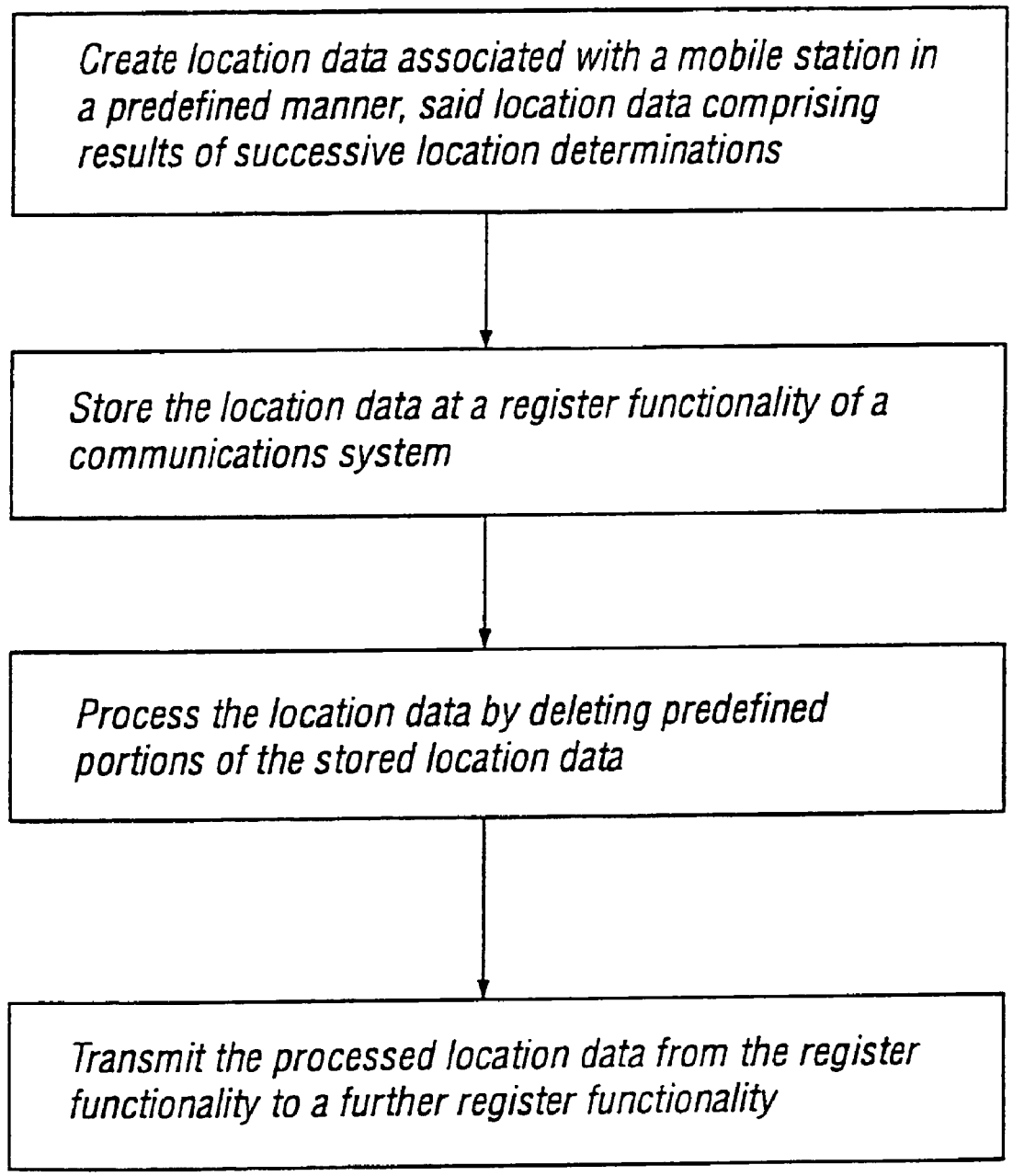
FIG. 5 is another flow chart for operation in accordance with an embodiment.

It is possible to process further the location information stored at the location register and/or prior or during the transmission step. Exemplifying embodiments that include further processing of the information will be discussed in more detail later with reference to FIGS. 5 and 6.

According to one approach the amount of signalling can be reduced by means of a timer function in the visitor location registers, wherein the transmission of a new location information update will be initiated only after a predefined time has lapsed from the previous transmission of the location information. The timer period for the monitoring period may also be started only after said predefined time from the previous transmission.

The location information can be included in a message to the home location register. The HLR can be arranged to check (e.g. by a controller 27) from the received messages whether they include location information. The controller of the visitor location register or the home location register may be arranged to monitor if any such messages are sent between the registers.

If the message received from the visitor register contains location information, then the controller 27 will determine whether the location/timestamp of the location information has been changed from the one the home location register 13 has in its database 28. In the case of a changed location/timestamp the home location register may then use this more recent information when providing location information for use in the location information service 16.

According to one possibility the location information will be included only in certain types of message from the first location register to the second location register, and/or certain type of messages between the registers (in either direction) will initiate the transmission of location information from the first register to the second register. For instance, it is possible for the VLR 11 to send the location information to the home location register 13 when the VLR 11 purges the subscriber data and transmits a purge-message to the home location register together with a timestamp. The purging of the subscriber data will occur when the VLR has not had any contact with the mobile station for a predefined period. If the home location register has not received any indication from any other of the VLRs that the mobile station is now temporarily registered in one other VLR, the HLR will mark the mobile station subscription with a "not reachable" flag.

According to one possibility the location information is determined and sent from the visitor location register to the home location register each time the mobile station accomplishes an IMSI (International Mobile Subscriber Identity) detach (when the mobile station is switched off) or an IMSI attach (when the mobile station is switched on). It is to be understood that the identity of the mobile station or the mobile subscriber can provided by many other means than by the IMSI as well. In addition to the change in the operational status of the mobile station, the location information can be sent in instances where the status of the used communication system changes.

The transmission of the location information from a location information register of the communications system to a further location register can also be initiated by the location server 16 or some other network element, e.g. by one of the network controllers 10 or 20 of FIG. 1. As shown by FIG. 4, the location server may initiate tracking operation and sent a request for receiving updated geographical location information from one or several location registers of the communication system. A further condition can be a call initiated or received by the mobile station.

FIG. 4 shows also a tracking mode initiated by the LCS functionality. In tracking mode the communication system will provide the LCS functionality with geographical location information with more dense intervals, e.g. in every 3 seconds. However, the timer functionality can be arranged to prevent the transmission even during the tracking mode in case no updates (changes) have been occurred.

It is noted that the second location register may be included in the location service functionality instead of routing the information from the first register through a second register to the location service functionality.

The location information can be transmitted as a dedicated MAP message or as a piggybag or encapsulated message. In some embodiments the location information is transmitted as a dedicated message only if there are no other messages from the visitor location register to the home location register, otherwise the location information would be encapsulated with the other message.

It is to be appreciated that more than one of the above described events can be used in parallel for the monitoring of a single mobile station. The arrangement may be such that the location information is not transmitted at the end of the period if one condition of the several conditions is met. Alternatively, occurrence of only one event during the monitoring period will not remove the need of the location information transmission procedure.

According to a further embodiment the stored geographical location information is processed further such that it is possible to provide further savings in the memory and/or transmission resources of the system. As shown by the flow chart of FIG. 5, the processing can comprise deleting a part of the geographical location information stored in one or several registers of the communication system. The deletion is preferably arranged to be time dependent, i.e. such that the deletion "density" of successive stored location measurement results is a function of time f(t). The deletion can occur logarithmically or be based on any other appropriate algorithm.

Figure 6:
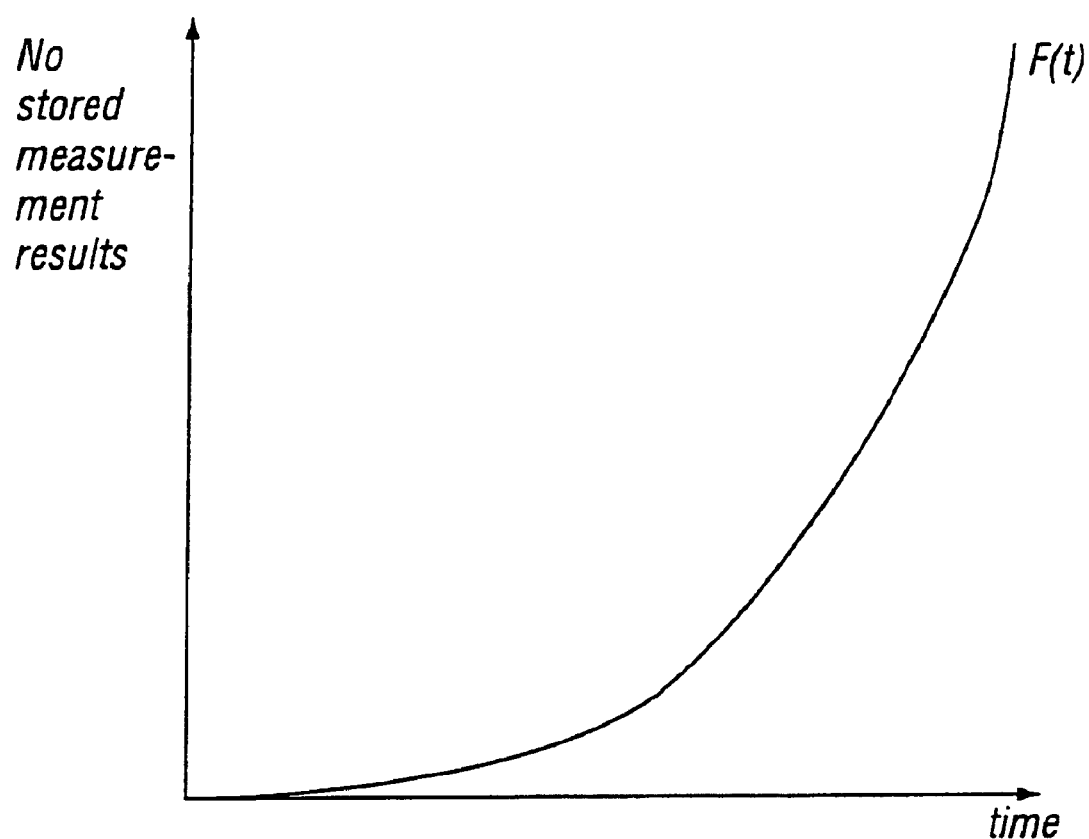
FIG. 6 is a diagram illustrating the operation of an embodiment.

The diagram of FIG. 6 illustrates an embodiment in which a greater portion of older location information becomes deleted while the more recent information is not deleted or only small portion of the more recent information becomes deleted. The arrangement can be e.g. such that when the stored data consists of 50 location measurements (measurement m1-measurement m50) before the deletion procedure, the remaining results in the storage functionality could, for instance, consist of the following sequence:

m1, m15, m25, m33, m40, m43, m45, m47, m48, m49, m50.

This kind of deletion does not have any remarkable negative influence on the reliability of the location determination at the location service. The location determination will in most cases be based on the more recently measured location data whereas the "older" location data may be used only in assisting the determination of the accurate geographical location in situations where some history information is also required. Such procedure is required e.g. when determining the direction from which the mobile station has come to the current location. By means of the direction it is then possible to define e.g. the side of a river the mobile station will likely be. The results remaining after the deletion procedure will be in most cases sufficient to provide the required history.

The deletion may occur in any of the registers or network elements involved in the creation and processing of the geographical location information. The deletion may be performed periodically, e.g. under a control of a timer. According to one embodiment the location server controls the processing of the stored data in various registers of the communication system. The deletion may also be performed whenever a predefined amount of the available memory capacity at the register has been used or whenever any other predefined condition is met.

In addition or as an alternative to the deletion, it is also possible to compress the stored information. Various compression techniques are known by the skilled person, and will not be described in more detail herein.

Different mobile users can have individual subscriber parameters. That is, different subscribers may have different timer periods, different update and/or deletion intervals or any other parameters. Some subscribers may also be excluded from the location information provision functionality. It is also possible to define whether the mobile station position is stored in the system while the station is switched off and/or is otherwise non-reachable. Different subscribers may also be divided into different location information provision classes.

The subscriber parameters can also be changed or updated, which is preferably accomplished at the home location register from where the changed/updated information is then transmitted to the appropriate visitor location registers.

According to further embodiments, the accuracy of the location information can be improved by utilizing results of various distance measurement techniques which e.g. define the travel time and/or travel time differences and/or the quality of the radio signal sent by the mobile station and/or by the base station. The distance measurements can be accomplished by more than one (e.g. three) different base stations covering the area in which the mobile station is currently located. According to one embodiment the measurement by a station gives the distance (range) between the base station and the mobile station or, if distance differences are measured, the distance difference (range difference) between the mobile station and two base stations. It is also possible to define error correction parameters by means of which the accuracy of the location determination and thus the location information obtainable from the telecommunications system can be further improved.

According to one embodiment, the mobile station defines its position using the base stations and/or external positioning means, such as a satellite based positioning system (e.g. the GPS; Global Positioning System). This location information is then transmitted to the visitor location register and further to the home location register, as explained above.

The location information provided by the telecommunications system or an external location system may also be used for purposes other than call processing such as for routing, charging, resource allocation, handover proceedings and so on. There are several possible commercial and non-commercial applications which may use the geographical location information if it is readily available. These possible applications include: different local advertisement and information distribution schemes e.g. transmission of information directed to those mobile users only who are currently within a certain location area; area related WWW-pages such as time tables, local restaurant guides, shop guides or hotel guides, maps, local advertisements and so on; location of those who have called to an emergency number; and tracking of mobile users by anyone who wishes to receive this information and is legally entitled to obtain it. An application requiring precise and real-time location information of the movement of a mobile station is a mobile station movement prediction feature that could be utilized, for example, in dynamic network resource allocation and in handover procedures. There are various other possible uses of the location information and applications which may use the location information. In general, all applications which need geographical location of the mobile station may find the location information provided and/or processed by means of the communications system useful. The usability of the location information is increased by improving the accuracy and reliability of the location information provided by the communications system.

According to an approach the status check is done every time the VLR is sending a message to the HLR. In other words, the message indicates an end of the monitoring period. This embodiment may avoid use of any timer functionality or periodical checks or similar operations based on time. This check can be done e.g. by the control unit 26 of the VLR 11.

It should be appreciated that whilst embodiments of the present invention have been described in relation to mobile stations, embodiments of the present invention are applicable to any other suitable type of user equipment.

It is also noted that the permanent location register referred to above as the home location register can also be implemented in the location server node. For instance, the GSM based systems may have a GMLC (Global Mobile Location Center) which is used both as a permanent location register and a location service. This kind of arrangement can be advantageous for subscribers who do not roam outside their home network, but may also be used for other type of subscribers.

The embodiment of the present invention has been described in the context of a GSM system which utilizes a time division multiple access (TDMA). This invention is also applicable to any other access techniques including frequency division multiple access (FDMA) and code division multiple access (CDMA) as well as any hybrids thereof.

It is also noted herein that while the above describes exemplifying embodiments of the invention, there are several variations and modifications which may be made to the disclosed solution without departing from the scope of the present invention as defined in the appended claims.

The invention claimed is:

1. A method in a communication system for providing a location service with geographical location information associated with a user equipment capable of communicating with the communication system, the method comprising:
   (a) storing geographical location information associated with a user equipment at a first location register of a communication system;
   (b) checking an indicator stored in the first location register, at the end of a monitoring period, to determine if the geographical location information was transmitted from the first location register to a second location register during the monitoring period, wherein the end of the monitoring period is determined using a timer;
   (c) if the geographical location information was not transmitted from the first location register to the second location register during the monitoring period, transmitting the geographical location information from the first location register to the second location register at the end of the monitoring period;
   (d) after transmitting the geographical location information from the first location register to the second location register in (c), resetting the timer; and
   (e) repeating (b)-(d).

2. A method according to claim 1, further comprising (e) transmitting the geographical location information from the first location register to the second location register after a predefined change in the operation status of the user equipment or the communication system.

3. A method according to claim 1, further comprising (e) determining if a transmission between the first location register and the second location register includes the geographical location information.

4. A method according to claim 3, wherein the transmission comprises a purge message from the first location register to the second location register.

5. A method according to claim 3, further comprising attaching information to the geographical location information that the user equipment is non-reachable.

6. A method according to claim 5, wherein the non-reachable information is indicated by a flag.

7. A method according to claim 1, further comprising (e) transmitting the geographical location information from the first location register to the second location register after a request from a location service to receive geographical location information during the monitoring period.

8. A method according to claim 1, further comprising (e) transmitting the geographical location information from the first location register to the second location register after establishment of a call connection from or to the user equipment during the monitoring period.

9. A method according to claim 1, wherein the geographical location information includes a timestamp.

10. A method according to claim 1, further comprising:
    receiving the geographical location information at the second location register;
    verifying whether the received geographical location information is more recent than geographical location information stored in the second location register; and
    if the received information is more recent, updating the geographical location information stored in the second location register.

11. A method according to claim 1, further comprising:
    requesting geographical location information associated with the user equipment from the second location register; and
    transmitting the requested geographical location information from the second location register to a location service as a response to the request.

12. A method according to claim 1, wherein the stored geographical location information comprises results of successive measurements associated with the geographical location of the user equipment.

13. A method according to claim 12, further comprising deleting at least some of the stored geographical location information.

14. A method according to claim 13, wherein the deleting is accomplished as a function of time such that the remaining geographical location information comprises proportionally more recent results than older results.

15. A method according to claim 12, further comprising compressing the stored geographical location information.

16. A method according to claim 1, wherein the communication system comprises a cellular telecommunications network and the first location register comprises a visited location register associated with a visited area of the communication system.

17. A method according to claim 1, wherein the user equipment is permanently registered with the second location register and temporarily registered with the first location register.

18. A method according to claim 1, wherein the second location register comprises a home location register of the communication system.

19. A method according to claim 1, wherein the second location register comprises a register functionality of a location service.

20. A method according to claim 1, wherein said user equipment comprises a mobile station.

21. A method according to claim 1, further comprising (e) transmitting the geographical location information from the first location register to the second location register after attachment or deattachment of the identity of the user equipment during the monitoring period.

22. A method according to claim 1, wherein different information provision parameters may be associated with different user equipment of the communication system.

23. A method according to claim 1, further comprising changing an information provision parameter of the user equipment.

24. The method of claim 2, further comprising resetting the timer after transmitting the geographical location information from the first location register to the second location register in (e).

25. The method of claim 2, further comprising setting an indicator to indicate transmission of the geographical location information from the first location register to the second location register during the monitoring period.

26. The method of claim 3, further comprising resetting the timer after transmitting the geographical location information from the first location register to the second location register in (e).

27. The method of claim 3, further comprising setting an indicator to indicate transmission of the geographical location information from the first location register to the second location register during the monitoring period.

28. The method of claim 1, further comprising switching off the timer if the user equipment is switched off.

29. The method of claim 1, further comprising before (c), determining if the geographical location information has changed, and if the geographical location information has not changed, resetting the timer without transmitting the geographical location information and repeating (b)-(d).

30. A communication system, comprising:
a first location register, wherein the first location register is configured to store geographical location information associated with a user equipment of the communication system;
a second location register configured to receive the geographical location information from the first location register; and
a controller configured (a) to check an indicator stored in the first location register, at the end of a monitoring period, to determine if the geographical location information was transmitted from the first location register to the second location register during the monitoring period, wherein the end of the monitoring period is determined using a timer;
(b) to initiate the transmission of the geographical location information from the first location register to the second location register if the geographical location information was not transmitted from the first location register to the second location register during the monitoring period;
(c) to reset the timer after transmitting the geographical location information from the first location register to the second location register in (b); and
(d) to repeat (a)-(c).

31. A communications system according to claim 30, wherein the controller is further configured to set an indicator to indicate transmission of the geographical location information from the first location register to the second location register during the monitoring period after one or more of the following events: a transmission of a message including geographical location information from the first location register to the second location register, a predefined type of transmission from the first location register to the second location register, a predefined change in the operational status of the user equipment, a predefined change in the operational status of the communication system, attachment or deattachment of the identity of the user equipment, a request by a location service to receive geographical location information, and a call to or from the user equipment.

32. A communications system according to claim 30, further comprising a location information server configured to request location information associated with the user equipment.

33. A communications system according to claim 30, wherein the communications system comprises a cellular communications network, the user equipment comprises a mobile station and the first location register comprises a visited location register associated with a visited area of the communication system, said user equipment being temporarily registered with said first location register.

34. A communications system according to claim 32, wherein the location information server comprises the second location register.

35. A communications system according to claim 30, wherein the second location register comprises a home location register of the communication system, said user equipment being permanently registered with the second location register.

36. A communications system according to claim 30, further comprising the user equipment wherein the user equipment is configured to determine its location and to transmit the location information to another element of the communication system.

37. A communications system according to claim 30, wherein the controller is further configured to delete a portion of the geographical location information stored at the first location register and/or the second location register.

38. The system of claim 30, wherein the controller is implemented at the first location register.

39. The system of claim 30, wherein the controller is implemented at the second location register.

40. The system of claim 30, wherein the controller is further configured to reset the timer after one or more of the following events: a transmission of a message including geographical location information from the first location register to the second location register, a predefined type of transmission from the first location register to the second location register, a predefined change in the operational status of the user equipment, a predefined change in the operational status of the communication system, attachment or deattachment of the identity of the user equipment, a request by a location service to receive geographical location information, and a call to or from the user equipment.

* * * * *

UNITED STATES PATENT AND TRADEMARK OFFICE
CERTIFICATE OF CORRECTION

| | | |
|---|---|---|
| PATENT NO. | : 7,532,894 B1 | Page 1 of 1 |
| APPLICATION NO. | : 10/110661 | |
| DATED | : May 12, 2009 | |
| INVENTOR(S) | : Muhonen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Twenty-eighth Day of September, 2010

David J. Kappos
*Director of the United States Patent and Trademark Office*